United States Patent
Knott et al.

(10) Patent No.: US 7,418,095 B2
(45) Date of Patent: Aug. 26, 2008

(54) SYSTEM AND METHOD FOR PROVIDING CALLER ACTIVITIES WHILE IN QUEUE

(75) Inventors: Benjamin A. Knott, Round Rock, TX (US); Theodore B. Pasquale, Austin, TX (US); Kurt M. Joseph, Austin, TX (US); Scott H. Mills, Austin, TX (US); James T. Miller, Austin, TX (US); Robert R. Bushey, Cedar Park, TX (US); John M. Martin, Austin, TX (US)

(73) Assignee: AT&T Knowledge Ventures, L.P., Reno, NV (US)

(*) Notice: Subject to any disclaimer, the term of this patent is extended or adjusted under 35 U.S.C. 154(b) by 0 days.

(21) Appl. No.: 10/383,138

(22) Filed: Mar. 6, 2003

(65) Prior Publication Data

US 2004/0174980 A1     Sep. 9, 2004

(51) Int. Cl.
*H04M 3/00* (2006.01)
*H04M 5/00* (2006.01)

(52) U.S. Cl. .............................. 379/266.06; 379/265.1; 379/265.01; 379/266.01

(58) Field of Classification Search ............ 379/266.01, 379/201.02, 93.12, 76, 266.03, 265.02, 265.11, 379/266.06, 265.1, 265.01, 265.05; 370/217; 704/232; 701/207
See application file for complete search history.

(56) References Cited

U.S. PATENT DOCUMENTS

| | | | | |
|---|---|---|---|---|
| 5,185,782 A | | 2/1993 | Srinivasan | 379/67 |
| 5,978,467 A | * | 11/1999 | Walker et al. | 379/266.01 |
| 6,014,439 A | * | 1/2000 | Walker et al. | 379/266.01 |
| 6,061,433 A | * | 5/2000 | Polcyn et al. | 379/93.12 |
| 6,125,178 A | | 9/2000 | Walker et al. | 379/266 |
| 6,178,240 B1 | | 1/2001 | Walker et al. | 379/266 |
| 6,195,426 B1 | * | 2/2001 | Bolduc et al. | 379/266.01 |
| 6,243,675 B1 | * | 6/2001 | Ito | 704/232 |
| 6,301,354 B1 | | 10/2001 | Walker et al. | 379/266.01 |
| 6,314,178 B1 | | 11/2001 | Walker et al. | 379/266.01 |
| 6,373,817 B1 | * | 4/2002 | Kung et al. | 370/217 |

(Continued)

OTHER PUBLICATIONS

Notification of Transmittal of the International Search Report and Written Opinion for PCT/US04/06677, 6 pages, mailed May 26, 2005.

(Continued)

*Primary Examiner*—Thjuan K Addy
(74) *Attorney, Agent, or Firm*—Jackson Walker L.L.P.

(57) ABSTRACT

A system and method for providing customer activities while in queue allows for one or more customers to interact with one or more customer activities while waiting to speak with a live agent. The customers engage the customer activities while holding in a queue where the customer activities reduce the boredom, frustration, and perceived hold duration associated with holding to speak to a live agent. The customers are offered one or more options of the customer activities to interact with and the system and method monitors the customers' selections and interaction with the customer activities. As agents become available, each customer is transferred to an agent along with information regarding the customer's interaction with a selected customer activity. Upon completion of the interaction between the agent and the customer, the customer has the option to return to the selected customer activity and continue interacting with the selected customer activity.

24 Claims, 3 Drawing Sheets

U.S. PATENT DOCUMENTS

| | | | |
|---|---|---|---|
| 6,400,804 B1 * | 6/2002 | Bilder | 379/76 |
| 6,456,711 B1 | 9/2002 | Cheung et al. | 379/265.09 |
| 6,687,608 B2 * | 2/2004 | Sugimoto et al. | 701/207 |
| 6,751,306 B2 * | 6/2004 | Himmel et al. | 379/201.02 |
| 6,826,276 B2 * | 11/2004 | Brown et al. | 379/265.02 |
| 6,959,081 B2 * | 10/2005 | Brown et al. | 379/265.11 |
| 7,050,568 B2 * | 5/2006 | Brown et al. | 379/266.01 |
| 2002/0076032 A1 | 6/2002 | Rodriguez et al. | 379/266.01 |
| 2002/0191775 A1 * | 12/2002 | Boies et al. | 379/266.01 |
| 2003/0031309 A1 | 2/2003 | Rupe et al. | 379/265.02 |
| 2003/0108187 A1 * | 6/2003 | Brown et al. | 379/266.03 |
| 2003/0161464 A1 * | 8/2003 | Rodriguez et al. | 379/266.01 |

OTHER PUBLICATIONS

Notification of Transmittal of the International Search Report and Written Opinion for PCT/US04/06677, 11 pages, Nov. 17, 2005.

EP Search Report 04717431.3-2414 PCT/US2004/006677, Jul. 19, 2006.

Notification Concerning Transmittal of Copy of International Preliminary Report on Patentability for PCT/US04/06677 (Corrected Version), 5 pages, mailed Jun. 29, 2006.

* cited by examiner

SYSTEM AND METHOD FOR PROVIDING CALLER ACTIVITIES WHILE IN QUEUE

TECHNICAL FIELD OF THE INVENTION

The present invention relates generally to telecommunication services, and more specifically relates to a system and method for providing customer activities while in queue.

BACKGROUND OF THE INVENTION

Customers often call a company service call center or access a company's web page with problems or questions about a product or service or to alter their existing services. When calling, the customers often speak with customer service representatives (also known as agents) or interact with an interactive voice response (IVR) system. Because of the costs associated with live service agents, companies often do not employ enough agents to handle peak customer calling times without requiring the customers to hold before being able to speak to one of the agents. Further adding to the problem of too few agents is that the customers typically prefer interacting with a live agent instead of a recorded automated system and there are some customer problems and questions that cannot be adequately addressed by an automated system. During certain times of the day when a customer calls a customer service center, the customer cannot immediately speak with an agent because all the agents are currently assisting other customers. Therefore, the customer must hold in a queue until an agent becomes available to speak with the customer. Waiting on hold for long periods of time is very frustrating for the customers and results in reduced customer satisfaction for the company for which the customer is seeking service.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

When customers call a customer service center or call center seeking assistance with problems and questions or to perform account maintenance, the customers typically cannot immediately speak with a customer service representative or agent because there are often more customer calls than agents at any given time. Therefore, the customers must wait in a hold queue for a time period ranging from several seconds to several minutes before being able to speak with a live agent. During peak customer calling activity periods, the increased volume of customer calls may result in hold times exceeding thirty minutes with ten and twenty minute hold times not unusual. Excessive holding times before being able to speak with an agent are generally frustrating for the customers while some customers become frustrated when required to wait any amount of time before being able to speak to a live agent. Therefore, the hold times often result in reduced levels of customer satisfaction.

In order to partially mitigate the frustration relating to holding in order to speak with an agent, some customer service centers may play soothing or easy-listening music over the telephone in an attempt to help the customers pass time while they are holding. In addition, customer service centers may also play useful messages to the customers while they are holding in order alleviate some of the frustration related to holding. For instance, the service centers play messages to the holding customers that provide an estimated hold time, that assure the customers that an agent will be with them shortly, or that their call is very important to the company. Customer service centers have also tried to capitalize on the customers holding in a queue by playing advertisements to the customers or providing other company information that may be of interest to the customers. But playing advertisements or providing company information may produce a negative effect on the customer service centers because many customers do not like to listen to advertisements or company messages while holding. Therefore, the playing of advertisements and company information messages may result in even lower customer satisfaction levels.

By contrast, the example embodiment described herein allows for providing customer activities to the customers while the customers are holding in a queue. The example embodiment allows for the combination of customer activities with a customer service center holding queue. The customers engage in one or more customer activities that they consider useful or productive instead of passively holding to speak with the next available agent. Because the customers are actively participating in an activity while holding instead of passively listening to easy-listening music, company messages, or advertisements, the concept of holding becomes less frustrating for the customers. Furthermore, the actual hold time appears to pass more quickly for the customers because the customers have activities to occupy their time while holding instead of just counting down the hold time. In addition, the customer activities increase the customers exposure to and use of voice portals and self-service applications. Therefore, the customer activities reduce the frustration and monotony of holding to speak with a live agent and also reduce the perceived duration of hold time thereby sustaining and possibly increasing customer satisfaction levels for holding customers.

Figure 1:
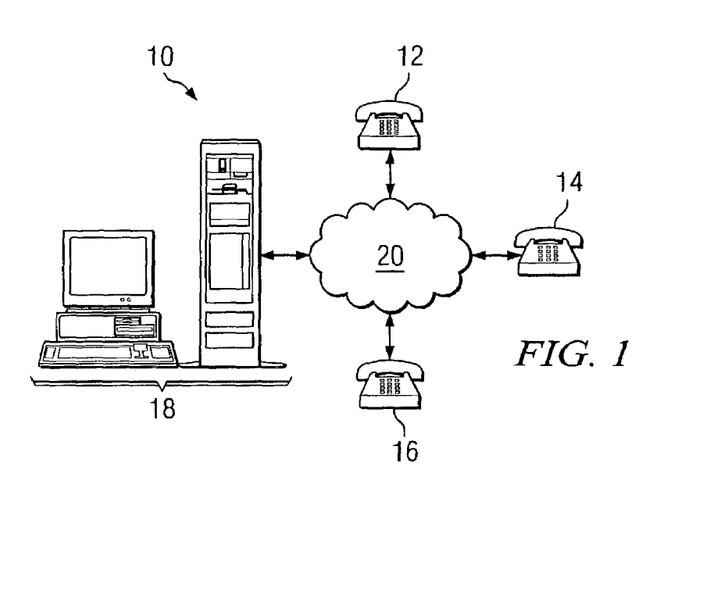
FIG. 1 depicts a schematic diagram of an example embodiment of a system for providing customer activities while in queue.

Referring now to FIG. 1, a schematic diagram of an example embodiment of a system for providing customer activities while in queue is depicted. Customer activity system 10 includes three customer premise equipment 12, 14, and 16 and service system 18 with customer premise equipment 12, 14, and 16 in communication with service system 18 via network 20. Customer premise equipment (CPE), also known as subscriber equipment, include any equipment that is connected to a telecommunications network and located at a customer's site. CPEs 12 and 14 may be telephones, 56 k modems, cable modems, ADSL modems, phone sets, fax equipment, answering machines, set-top box, POS (point-of-sale) equipment, PBX (private branch exchange) systems, personal computers, laptop computers, personal digital assistants (PDAs), SDRs, other nascent technologies, or any other appropriate type or combination of communication equipment installed at a customer's or caller's site. CPEs 12, 14, and 16 may be equipped for connectivity to wireless or wireline networks, for example via a public switched telephone network (PSTN), digital subscriber lines (DSLs), cable television (CATV) lines, or any other appropriate communications network. In the example embodiment of FIG. 1, CPEs 12, 14, and 16 are shown as telephones but in alternate embodiments may be any other appropriate type of customer premise equipment.

Telephones 12, 14, and 16 are located at the customer's premise. The customer's premise may include a home, business, office, or any other appropriate location where a customer may desire telecommunications services. Service system 18 is remotely located from telephones 12, 14, and 16 and is typically located within a company's customer service center or call center which may be in the same or a different geographic location as telephones 12, 14, and 16. The customers or callers interface with service system 18 using telephones 12, 14, and 16. The customers and telephones 12, 14, and 16 interface with service system 18 and service system 18 interfaces with telephones 12, 14, and 16 through network 20. Network 20 may be a public switched telephone network, the Internet, a wireless network, or any other appropriate type of communication network. Although only one service system 18 is shown in FIG. 1, in alternate embodiments service system 18 may serve alone or in conjunction with additional service systems located in the same customer service center or call center as service system 18 or in a customer service center or call center remotely located from service system 18. In addition, although three telephones 12, 14, and 16 are shown in FIG. 1, in alternate embodiments customer activity system 10 may include more than three or less than three telephones.

Figure 2:
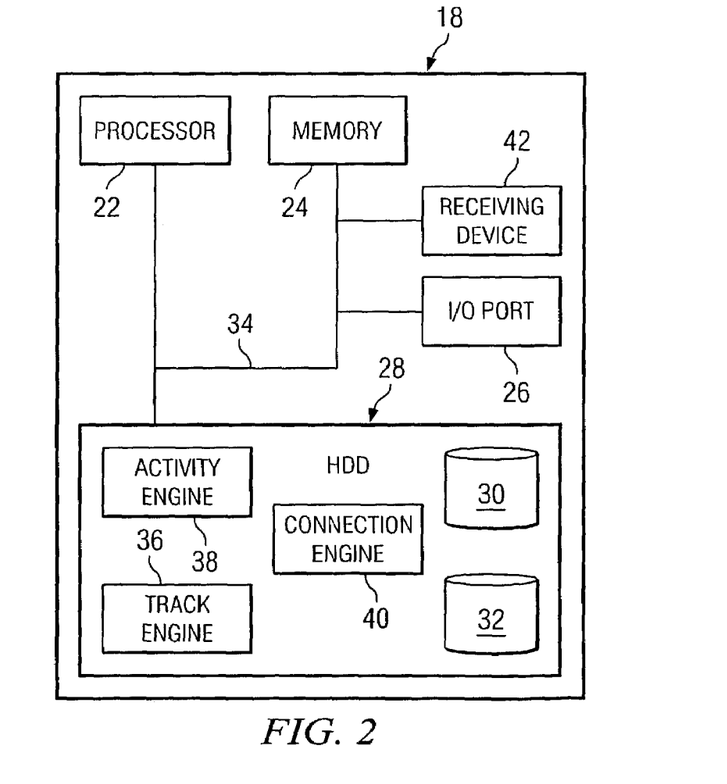
FIG. 2 illustrates a block diagram of an example service system.

FIG. 2 illustrates a block diagram of service system 18 in greater detail. In the example embodiment, service system 18 may include respective software components and hardware components, such as processor 22, memory 24, input/output ports 26, hard disk drive (HDD) 28 containing databases 30 and 32, and those components may work together via bus 34 to provide the desired functionality. In alternate embodiments, HDD 28 may contain more than two or less than two databases. The various hardware and software components may also be referred to as processing resources. Service system 18 may be a personal computer, a server, or any other appropriate computing device with a network interface for communicating over networks such as the telephone communication networks, the Internet, intranets, LANS, or WANs and located at a location remote from telephones 12, 14, and 16. Service system 18 also includes track engine 36, activity engine 38, and connection engine 40, which reside in memory such as HDD 28 and are executable by processor 22 through bus 34 as well as receiving device 42. Service System 18 may further include an automated speech recognition (ASR) engine and a text to speech (TTS) engine that enable customer activity system 10 to utilize a speech recognition interface with the customers on telephones 12, 14, and 16. The ASR engine allows service system 18 to recognize the speech or utterances provided by the customers in response to one or more prompts while the TTS engine allows service system 18 to playback to the customers in prompts variable data, such as data returned from a database search.

Receiving device 42 communicates with I/O ports 26 via bus 34 and in alternate embodiments there may be more than one receiving device 42 in service system 18 and customer activity system 10. One such type of receiving device is an automatic call distribution system ("ACD") that receives plural inbound telephone calls and then distributes the inbound telephone calls to agents or automated systems. Another type of receiving device is a voice response unit ("VRU") also known as an interactive voice response system ("IVR").

When a call is received by a VRU, the caller is generally greeted with an automated voice that queries the caller for information and then routes the call based on the information provided by the caller. When inbound telephone calls are received, typically VRU and ACD systems employ identification means to collect caller information such as automated number identification ("ANI") information provided by telephone networks that identify the telephone number of the inbound telephone call. In addition, VRUs may be used in conjunction with ACDs to provide customer service.

Figure 3A:
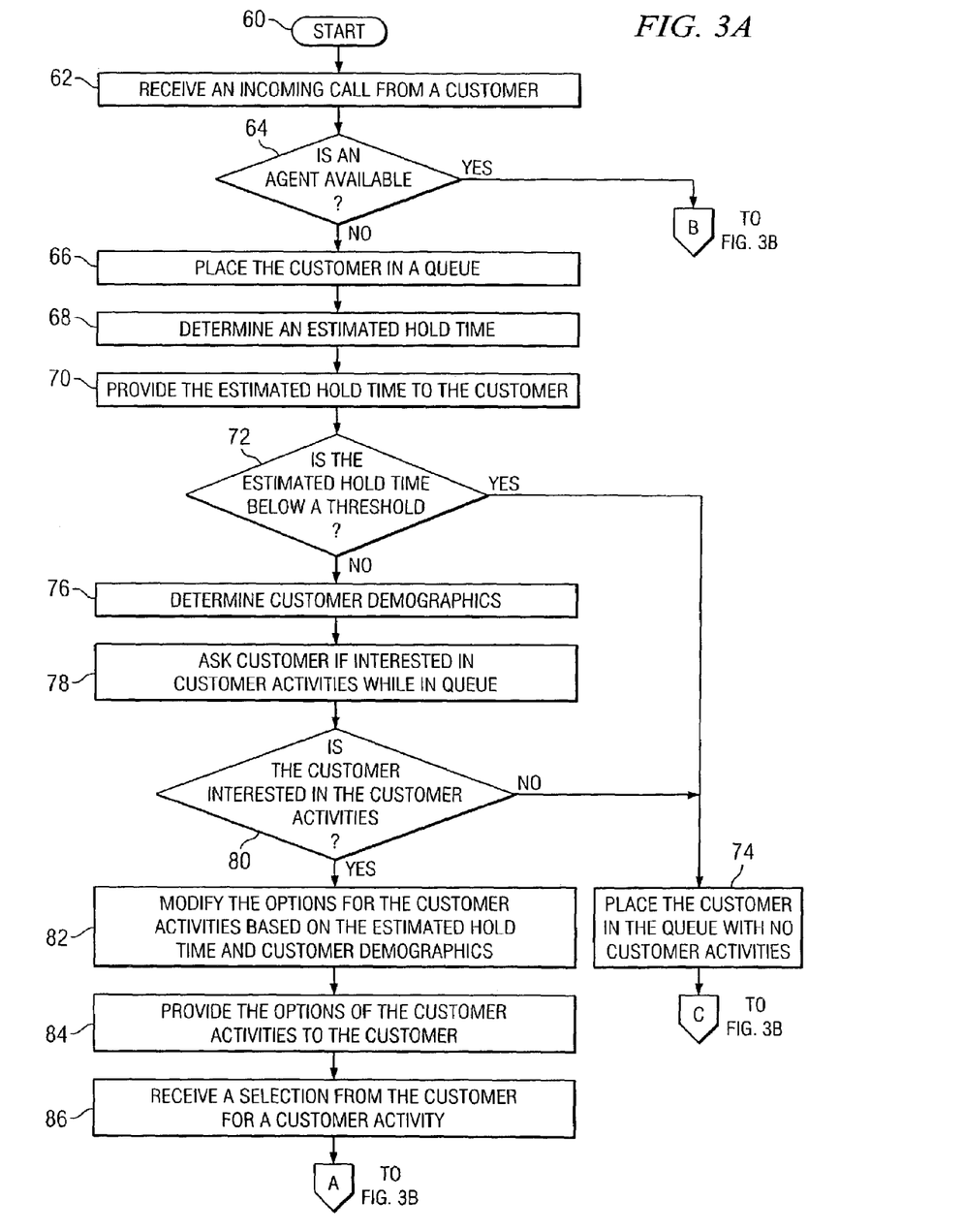
FIG. 3 depicts a flow diagram of an example embodiment of a method for providing customer activities while in queue.
Figure 3B:
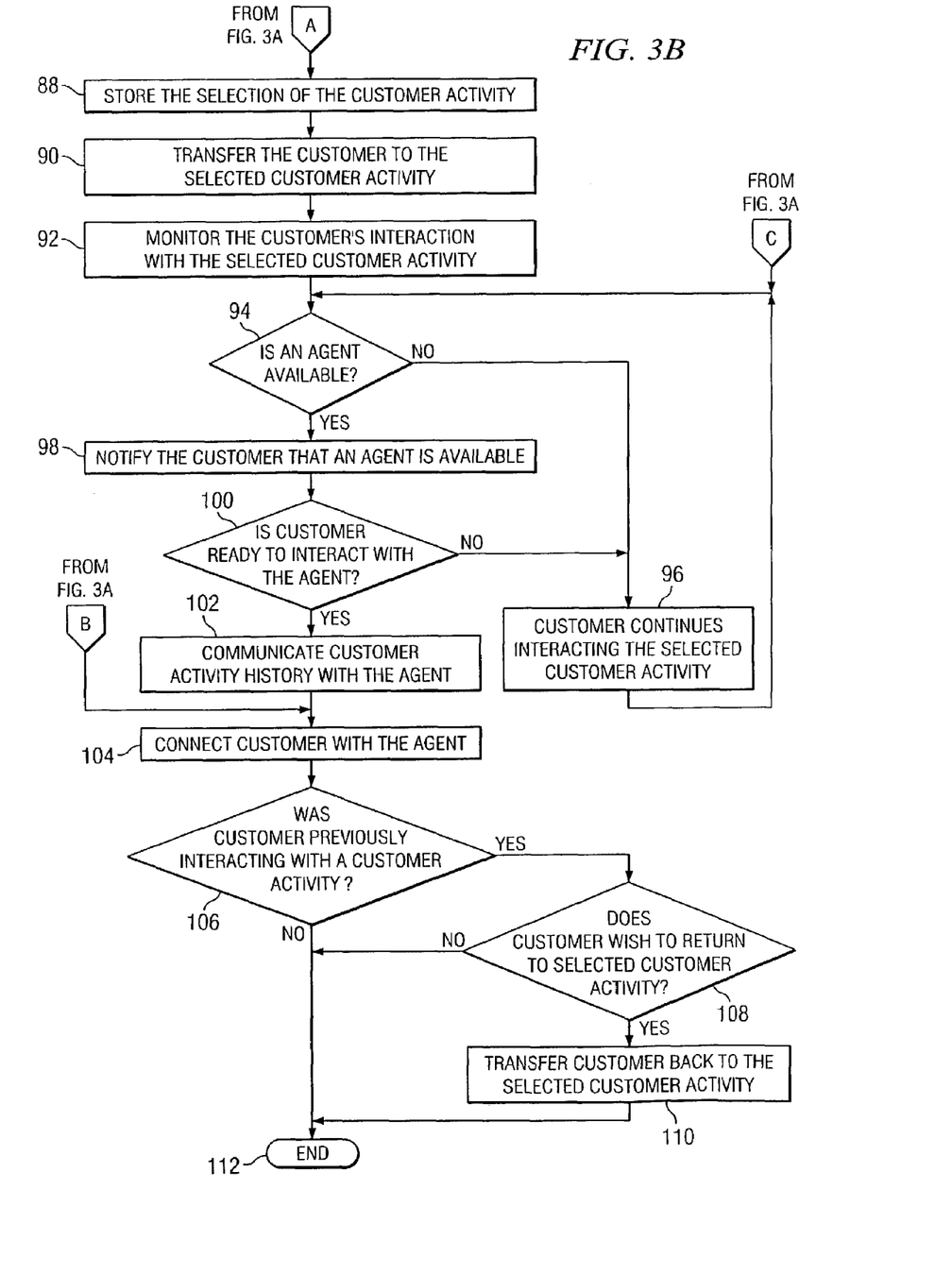

FIG. 3 illustrates a flow diagram of one embodiment of a method for providing customer activities while in queue. The method begins at step 60 and at step 62 receiving device 42 through I/O ports 26 receives one or more inbound inquires from one or more customers. The customers contact service system 18 via receiving device 42 over network 20 using telephones 12, 14, or 16 by calling a customer service telephone number. The customers may also access service system 18 through computers and the Internet. Once a customer's call has been received by receiving device 42, receiving device 42 determines if an agent is currently available to interact with the customer at step 64. An agent is available to interact with the customer if the customer can be immediately connected to a live agent without having to hold or be placed in a queue. If an agent is available at step 64, then the customer is immediately connected with the agent at step 104 and the customer interacts with the agent.

If no agents are available at step 64, then at step 66 receiving device 42 places the customer in a queue in order to hold for the next available agent. The queue the customer is placed in is typically a first in, first out queue where the customers are ordered by the time their calls were received by receiving device 42. For example, if customer Smith calls service system 18 at 3:30 P.M. and no agents are available, receiving device 42 places customer Smith in the queue. If customer Jones then calls service system 18 at 3:34 P.M. and there are still no available agents, then receiving device 42 places customer Jones in the queue behind customer Smith. When an agent becomes available, customer Smith is first connected to the agent and customer Jones moves up one position in the queue.

When receiving device 42 places the customer in the queue, receiving device 42 also calculates an estimated hold time in the queue for the customer at step 68 and provides the estimated hold time to the customer at step 70. The estimated hold time is based on the number of customers in front of the current customer in the queue, the total number of agents, and the average interaction time between the agent and the customer as well as other factors that affect how quickly the agents become available to interact with the customers.

Once receiving device 42 determines the estimated hold time, at step 72 activity engine 38 determines if the estimated hold time is below a low threshold value which affects whether the customer is provided the opportunity of interacting with customer activities. If the estimated hold time is below the low threshold, the customer will not be offered the option of any of the customer activities because the customer will not have an adequate amount of time to interact with the customer activities. Therefore, if at step 72 the estimated hold time is below a low threshold, then the customer is placed in the queue at step 74 but is not offered any customer activities and the process continues to step 94 as described below. When placed in a queue that does not offer the option of any customer activities, the customer is provided with the typical holding queue entertainment such as soothing music, company messages, and advertisements. For instance, a low threshold value may be thirty second or one minute. With an estimated hold time of below one minute, the customer will have very little time to interact with any of the customer activities before an agent becomes available. Just as the customer is hearing all of the available option for the customer activities, an agent will become available and the customer will be connected with the agent. It might be frustrating to the customer to think they are going to get to interact with one of the customer activities and then be connected with an agent and not get to interact with the customer activity. Therefore, customers having estimated hold times below a low threshold are placed in the queue without being offered any customer activities.

If at step 72 the estimated hold time is not below the low threshold, then at step 76 activity engine 38 determines one or more customer demographics regarding the customer placed in the queue at step 66. Customer demographics may be obtained by asking the customer questions regarding age, sex, and location. Alternatively, activity engine 38 may obtain the customer account number from the customer and search the customer records in database 30 for account information and customer demographics about the customer. For instance, with an account number, activity engine 38 can determine the customer's name, age, sex, location, services and products ordered, account status, and any other appropriate information regarding the customer.

Once activity engine 38 has determined the customer demographics, at step 78 activity engine 38 prompts the customer to see if the customer is interested in interacting with a customer activity while holding for the next available agent. The customer activities, or customer action capabilities, are activities that the customers can interact with at no cost to the customers in order to pass the time while holding for an available agent. Examples of customer activities include voice portals, self-service applications, listening to music, and any other appropriate type of customer entertainment for holding customers. Voice portals, for instance, utilize speech recognition technology to allow the customers to browse information over the telephone such as news, weather, horoscopes, sports scores, and movie reviews and times using simple voice commands. For instance, a customer interested in stock quotes can say "stock quotes" followed by the company name and receive the current stock quote for the company. Customers interested in movies can hear reviews and find theater locations and times for movies in their city. Another type of customer activity are self-service applications.

Self-service applications are voice activated systems that use speech recognition technology to allow the customers to browse information such as account balance, review their bills, and retrieve information about new products and services. For instance, if the customer is calling the customer service center for their telephone company, as a customer activity the customer can select self-service applications and interact with an automated system to pay their telephone bill, update address information, or learn about telephone products and services such as Call Forwarding or Caller ID. Other customer activities include listening to music that is customer selected instead of customer service center selected where such music may either be pre-recorded music or live feeds from radio stations.

When determining customer interest in the customer activities, an automated prompt may state to the customer, "An agent will be with you in ten to fifteen minutes. While you wait would you be interested in interacting with one of our customer activities?" If at step 80 the customer is not interested in interacting with one of the customer activities, then the customer remains in the queue with no customer activities and instead hears the soothing music, company messages, and advertisements. The customer does not lose his place in the queue because he does not select to interact with any customer activities. The customer merely does not have the same entertainment options as the customers that select to interact with the customer activities.

If the customer is interested in interacting with the customer activities at step 80, then at step 82 activity engine 38 modifies the options of available customer activities provided to the customer based on the estimated hold time and/or the customer demographics. For instance, if the estimated hold time is a relatively short time such as three minutes, the customer might only be offered the option of interacting with limited aspects of the voice portal or to listen to music and not offered any self-service applications because three minutes is not long enough for the customer to have any productive interaction with the self-service applications. For example, with a short hold time, activity engine 38 may only offer aspects of the voice portal that require small amounts of time such as stock quotes or horoscopes and not offer movie reviews because the customer would not be able to listen to all of the movie review before an agent becomes available. Or if the caller is a seventy-five year old man that would not be interested in interacting with a voice portal no matter how long the estimated hold time, activity engine 38 may only offer music and the self-service applications as options for customer activities.

Furthermore, activity engine 38 may modify the music selections offered to the customer based on customer demographics such as age and location. For instance, both prerecorded and radio stations may be offered as customer activities. If a customer is calling from Dallas, activity engine 38 may offer to the customer as a customer activity the option of listening to one or more Dallas radio stations and may alter the types of pre-recorded music available such as country, rock, classical, jazz, or R&B.

In addition, activity engine 38 may also modify the options for customer activities based on the customer demographic of the customer's account information where the account information is stored in database 30. If the customer's account information reveals that the customer is behind in payment of his bills, activity engine 38 may offer the customer the option of interacting with the self-service application so that the customer can be given the option of paying his bill while interacting with the automated self-service application. Also, based on the customer demographics activity engine 38 may determine that the customer would not be interested in any of the customer activities and the offering of the options of customer activities may frustrate the customer and although the estimated hold time is above the low threshold, activity engine 38 may offer the customer no customer activities and only the soothing music, company messages, and advertisements. In alternative embodiments, the options of customer activities may not be modified based on estimated hold times and/or customer demographics and therefore each customer would be provided with the same options for customer activities.

Once activity engine 38 determines which customer activities best fit the customer based on customer demographics, at step 84 activity engine 38 provides the different options of the customer activities to the customer. An automated prompt may state, "While you hold, would you like to listen to music, interact with a voice portal in order to browse the latest stocks, news, weather, and sports, or interact with a self-service application in order to pay a bill, update customer information, or get information about new products and services." Activity engine 38 may also offer the customer the option of not accepting any of the customer activities and therefore just listening to the soothing music, company messages, and advertisements while in queue. This option may be appealing to a customer calling from work having a telephone including a speakerphone where the customer can just put the telephone on speakerphone and go about working until an agent becomes available.

When the customer makes a selection, activity engine 38 receives the selection at step 86. Some of the customer activities may require the customer to make one or more additional selections. For instance, if the customer selects to listen to music, the customer may then need to decide whether to listen to pre-recorded music or a radio station and once the customer decides between pre-recorded music and the radio stations, the customer will need to select the type of music or the radio station.

When the customer makes their selection, track engine 36 monitors the selection and stores that selection in database 32 at step 88. Track engine 36 monitors and stores the customers' selections to create a customer activity history so that service system 18 will know where to send the customer after the customer finishes interacting with the agent and also to further modify the options of customer activities provided to the customers. Track engine 36 monitors and records every selection of customer activities made by the customers. Using the customer selections of the customer activities, track engine 36 determines a frequency of selection for each of the customer activities in order to determine which customer activities are selected the most by the customers and which are selected the least by the customers. Track engine 36 has the option of modifying the options of customer activities provided to the customers as well as the order in which the customer activities are provided to the customers based on the frequency of selection for each of the customer activities.

For instance, if eighty percent of the customers select to interact with the voice portal, fifteen percent select to listen to music, and five percent select self-service applications, then when activity engine 38 provides the options of the customer activities to the customers, the voice portal will be listed as option one, listening to music will be listed as option two, and interacting with the self-service application will be listed as option three. Furthermore, the operator of service system 18 may determine that a selection of only five percent of the customers is not enough to justify offering the self-service applications as a customer activity and therefore only offer the voice portal and listening to music as the customer activities. Because track engine 36 continuously monitors selections and updates the frequency of selections, the options of customer activities provided to the customers will always be in tune with what the customers desire and what the customers are selecting.

After the customer selects the desired customer activity, at step 90 activity engine 38 transfers and connects the customer with the selected customer activity so that the customer can interact with the selected customer activity. The customer activities may be located within service system 18, remote from service system 18 but within the same customer service center as service system 18, or remote from both service system 18 and the customer service center that houses service system 18. For instance, service system 18 may include a voice portal or the voice portal may be a service provided by a company different than the operator of service system 18 and therefore remote from service system 18. If the customer activity is located remote from service system 18, then activity engine 38 and service system 18 connect the customer with the selected customer activity via network 20. For example, the customer would be able to listen to local radio stations via network 20.

Before transferring the customer to the selected customer activity at step 90 or the queue with no customer activities at step 74, the customer demographics may be further utilized in order to provide a short, targeted advertisement to the customer. For instance, customer demographics reveal that a customer has dial-up Internet service and does not have DSL broadband Internet service. When the customer selects to interact with the voice portal as the selected customer activity, before being transferred to the voice portal, the customer hears a short advertisement such as, "Would you be interested in hearing about current deals on DSL broadband Internet services?" If the customer is not interested in hearing about any deals, the customer responds "No" and is immediately transferred to the selected customer activity. If the customer is interested in hearing about deals, the customer responds "Yes," listens to the current DSL deals, and can then either refuse to sign up for any of the deals or sign up for one of the DSL deals. After either rejecting or accepting one of the DSL deals, the customer is then transferred to the selected customer activity.

While the customer is interacting with the selected customer activity, at step 92 track engine 36 monitors the customers' interaction with the selected customer activity for what aspects of the customer activity the customer interacts with. For example, if the customer selects the voice portal, then track engine 36 monitors if the customer selects stock quotes, news, or movie reviews for instance. Track engine 36 stores information regarding the customers' interaction with the customer activities in database 32 to further add to the customer activity history for each customer.

As the customer interacts with the selected customer activity and remains in the queue holding to speak with an agent, at step 94 connection engine 40 continuously checks if agents are available to interact with the customer. If an agent is not yet available to interact with the customer at step 94, then at step 96 the customer continues interacting with the selected customer activity until an agent is available at step 94. As the customer continues to interact with the selected customer activity at step 96, the customer maintains his place in the queue moving up a position in the queue each time a customer ahead of him in the queue is connected to one of the agents until the customer is at the top of the queue and is therefore in position to be connected to the next available agent.

When an agent is available at step 94, at step 98 connection engine 40 notifies the customer that an agent is available to interact with the customer. Connection engine 40 may notify the customer of the agent availability by a prompt such as, "An agent is ready to assist you now. Would you like to speak with the agent now? You can return to your selected customer activity if you wish, when you are finished speaking with the agent." Therefore at step 100, the customer has the option of immediately connecting with the agent or continuing to interact with the selected customer activity.

If at step 100 the customer is not ready to interact with the agent, the process proceeds to step 96 where the customer continues to interact with the selected customer activity. A customer may not want to speak with an agent if the customer is in the middle of a particular action within the customer activity. For instance, the customer may be listening to a movie review in the voice portal and be halfway through the movie review when an agent becomes available. The customer may desire to hear the rest of the movie review instead of connecting with the agent. Therefore the customer responds that he is not ready to interact with the agent and will continue interacting with the selected customer activity. If the customer decides to continue interacting with the selected customer activity, the customer remains at the top of the queue and when the next agent becomes available the customer is again offered the option of interacting with the agent.

Alternatively, connection engine 40 may not immediately notify the customer that an agent is available if the customer is in the middle of an activity or action that will conclude momentarily. Instead, connection engine 40 notifies the customer after the activity has concluded. For instance, the customer may be in the voice portal browsing information about stock quotes. As soon as the customer provides a company name for a stock quote, the next agent becomes available. Instead of not letting the customer hear the stock quote or interrupting with a notification causing the customer to not hear the stock quote, connection engine 40 waits until the voice portal provides the stock quote to the customer before notifying the customer that an agent is now available.

Furthermore in alternative embodiments, connection engine 40 may not let the customer know that an agent is available based on the customer's selected customer activity. For instance, if the customer selects to interact with the self-service application as the customer activity and is in the process of paying his bill when an agent becomes available, connection engine 40 may not interrupt. Because the customer is paying his bill, the operator of service system 18 may not want to interrupt such an action in order to connect the customer to the agent. And connection engine 40 includes the knowledge of what the customer is doing within the selected customer activity because track engine 36 monitors what the customer does within the selected customer activity. The customer remains at the top of the queue while completing paying the bill and is connected to an agent as soon as the bill payment transaction is complete.

In an alternative embodiment, connection engine 40 may not give the customer the option of deciding whether to speak to the agent as soon as the agent becomes available and instead automatically connect the customer with the agent as soon as one of the agents becomes available. Therefore, the connection engine 40 would not take into account how the customer is interacting with the selected customer activity which may allow for quicker connections between customers and agents because the customers cannot decide to hold longer than needed in order to further interact with the customer activities.

If at step 100 the customer is ready to interact with one of the agents, then at step 102 track engine 36 communicates the customer activity history to the agent before the customer is connected with the agent. Track engine 36 communicates the customer activity history to the agent utilizing on-screen information, a whisper, or any other appropriate way of communicating the information. Track engine 36 may place on the agent's monitor or screen the customer activity history so that the agent can read it before the customer is connected with the agent. Also, track engine 36 may "whisper" the customer activity history to the agent where the customer activity history is verbally communicated to the agent via a headset the agent is wearing.

The customer activity history includes information regarding the selected customer activity for the customer as well as the selections made within the selected customer activity. For instance, if the customer selected to interact with the self-service application and paid a bill, the customer activity history would include information that the customer selected to interact with the self-service application and paid a bill. If the customer selected to listen to music, the customer activity history would include information that the customer selected to listen to music and either the radio station selected or the genre of music selected. The customer activity history is especially valuable to the agents when the customer has been interacting with the self-service applications in instances where the agent can elaborate and expand upon what the customer was doing in the self-service applications. For instance, if in the self-service application the customer was obtaining more information about Caller ID, then when the agent speaks to the customer the agent can ask the customer if she has any additional questions about Caller ID or if she would like to order Caller ID.

After track engine 36 communicates the customer activity history to the agent, at step 104 connection engine 40 connects the customer to the agent and the agent and customer conduct their necessary business. Once the agent and customer finish interacting, the customer has the option of returning to the selected customer activity that the customer was interacting with before the agent became available. Therefore, at step 106 connection engine 40 examines the customer activity history in order to determine if the customer was interacting with a customer activity while holding. If the customer was not interacting with a customer activity then the call ends and the method ends at step 112. If at step 106 the customer activity history reveals that the customer was interacting with a customer activity while holding, then at step 108 the customer is provided with the option of returning to the selected customer activity or ending the call. If the customer elects to not return to the customer activity and therefore end the call, then the call terminates and the method ends at step 112.

If at step 108 the customer desires to return to the selected customer activity, then at step 110 connection engine 40 utilizing the customer activity history returns the customer to the selected customer activity. The call ends at step 112 when the customer finishes interacting with the selected customer activity. The customer can be returned to the exact point within the selected customer activity that the customer was at when the customer was transferred to the available agent or at the beginning of the customer activity. Furthermore, returning the customer to the selected customer activity may be a manual or automated process. For instance, when the agent completes the call with the customer, the agent may ask the customer if the customer desires to return to the selected customer activity. If the customer responds yes, then the agent may then transfer the customer back to the selected customer activity or the agent select a key and connection engine 40 transfers the customer back to the selected customer activity. Alternatively, when the agent completes the interaction with the customer, the agent may disconnect from the customer but not terminate the call. Once the agent disconnects, connection engine 40 checks the customer activity history to determine if the customer was previously interacting with a customer activity and if so, offers the customer via a voice prompt the option of returning to the customer activity. If the customer selects to return to the selected customer activity, then connection engine 40 automatically transfers the customer back to the selected customer activity.

It should be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, DVD-ROMs, read-only memory, and random access memory; as well as communications media such as wires, optical fibers, microwaves, radio waves, and other electromagnetic or optical carriers.

In addition, one of ordinary skill will appreciate that alternative embodiments can be deployed with many variations in the number and type of devices in the system, the communication protocols, the system topology, the distribution of various software and data components among the hardware systems in the network, and myriad other details without departing from the present invention.

Although the present invention has been described in detail, it should be understood that various changes, substitutions and alterations can be made hereto without departing from the spirit and scope of the invention as defined by the appended claims.

What is claimed is:

1. A method for providing caller activities to a caller holding in a queue, the method comprising:
   receiving an incoming call from a caller via a phone system;
   determining if an agent is available to interact with the caller;
   determining an estimated hold time to interact with the agent;
   providing the estimated hold time to the caller;
   placing the caller in a queue;
   offering the caller one or more caller activities for the caller to interact with via the phone system while remaining in the queue, including determining the caller activities to offer based at least on the estimated hold time;
   receiving a selection of one of the particular caller activities from the caller;
   connecting the caller to the selected caller activity while the caller remains in the queue;
   creating a caller activity history indicative of the caller's selection of the caller activity and the caller's interaction while connected to the selected caller activity while holding in the queue;
   connecting the caller with the agent when the agent is available to interact with the caller; and
   communicating the caller activity history to the agent in real time.

2. A method for providing caller activities while in a queue, the method comprising:
   receiving an incoming call from a caller having an account;
   placing the customer on-hold in a queue to interact with an agent;
   providing the caller with an option of one or more customer activities to perform while remaining in the queue, the caller activities including at least one self-service activity related to managing the caller's account;
   transferring the caller from being on-hold to interacting with a selected self-service customer activity while the caller remains in the queue; and
   creating a caller activity history indicative of the caller's selection of the customer activity and said interacting while on-hold in said queue; and
   after a period of caller interaction with the selected self-service caller activity, transferring the caller from the selected self-service caller activity to the agent; and
   communicating the caller activity history to the agent.

3. The method of claim 2 further comprising communicating the caller activity history to the agent when the agent becomes available to interact with the customer.

4. The method of claim 2 further comprising notifying the caller when the agent is available to interact with the caller.

5. The method of claim 4 wherein notifying the caller when the agent is available comprises providing the caller an option of interacting with the agent or continuing to interact with the selected self-service caller activity.

6. The method of claim 2 wherein providing the caller with an option of one or more caller activities comprises modifying which of the caller activities are provided as the options to the caller based at least on a estimated hold time and one or more caller demographics including at least one of the caller's age, gender and location.

7. The method of claim 2 further comprising:
   tracking a frequency for which a plurality of callers select the caller activities;
   determining a frequency of selection by the plurality of callers for each of to caller activities; and
   based on the determined frequency of selection by the plurality of callers, modifying at least one of the caller activities that are provided to one or more subsequent callers as the options or modifying the order in which the caller activities are presented to the one or more subsequent callers as options.

8. The method of claim 2 further comprising transferring the caller back to the selected self-service caller activity upon the completion of the interaction between the agent and the caller.

9. The method of claim 2 further comprising:
   determining an estimated hold time to interact with the agent; and
   providing the estimated hold time to the caller before providing the options of caller activities to the caller.

10. The method of claim 2 further comprising waiting until the caller completes an action within the selected self-service caller activity before transferring the caller to the agent.

11. The method of claim 2 further comprising not providing the caller an option of one or more caller activities when an estimated hold time is greater than zero but below a threshold value.

12. A system for providing caller activities while in a queue, the system comprising:
   one or more receiving devices operable to receive an inbound inquiry, place a caller on-hold in a queue, and calculate an estimated hold time;
   an activity engine associated with the one or more receiving devices, the activity engine operable to:
      provide the caller with an option of a set of caller activities to perform while in the queue, the set of caller activities being determined based at least in part on the estimated hold time and including at least one self-service activity related to managing the caller's account;
      transfer the caller from being on-hold to interacting with a selected self-service caller activity;
      create a caller activity history indicative of the caller's selection of the caller activity and said interacting while in the queue; and
      communicate the caller activity history to the agent; and
   a connection engine associated with the activity engine and the track engine, the connection engine operable, after a period of caller interaction with the selected self-service caller activity, to transfer the caller from the selected self-service to an available agent.

13. The system of claim 12 further comprising one or more databases operable to store information regarding the selection of the caller activities and one or more caller actions taken within the selected caller activities.

14. The system of claim 12 further comprising a track engine operable to communicate a plurality of information regarding the caller's interaction with the selected self-service caller activity to the agent when the agent becomes available to interact with the caller.

15. The system of claim 12 further comprising the activity engine operable to modify which of the caller activities are provided as the options to the caller based at least on an estimated hold time and one or more caller demographics including at least one of the caller's age, gender and location.

16. The system of claim 12 further comprising the track engine operable to:
  monitor a frequency for which a plurality of customers select the caller activities;
  determine a frequency of selection by the plurality of customers for each of the caller activities; and
  based on the determined frequency of selection by the plurality of customers, modify at least one of the caller activities that are provided to one or more subsequent customers as the options or modify the order in which the caller activities are presented to the one or more subsequent customers as options.

17. The system of claim 12 further comprising the connection engine operable to transfer the caller back to the selected self-service caller activity upon the completion of the interaction between the agent and the caller.

18. The system of claim 12 further comprising the activity engine operable to not provide the caller an option of one or more caller activities when an estimated hold time is greater than zero but below a threshold value.

19. The system of claim 12 wherein the selected self-service caller activity comprises a voice portal.

20. A method according to claim 1, further comprising upon completion of the caller and the agent interaction, providing the caller an option of returning to the selected caller activity based on the caller activity history.

21. A method according to claim 2, further comprising monitoring one or more actions taken by the caller during said interacting with the selected self-service caller activity to create a caller activity history indicative of the caller's interaction with the selected self-service caller activity.

22. A method according to claim 20 further comprising upon completion of the interaction between the caller and the agent, providing the caller an option of returning to the selected self-service caller activity based on the caller activity history.

23. A system according to claim 12, further comprising a track engine associated with the activity engine, the track engine operable to monitor one or more actions taken by the caller during said interacting with the selected self-service caller activity to create a caller activity history regarding the caller's interaction with the selected self-service caller activity.

24. A system according to claim 23, further comprising the connection engine operable, upon completion of the interaction between the caller and the agent, to offer to return the caller to the selected self-service caller activity based on the caller activity history.

* * * * *